(12) United States Patent
Phinney

(10) Patent No.: US 7,720,318 B1
(45) Date of Patent: May 18, 2010

(54) FONT IDENTIFICATION SYSTEM

(75) Inventor: Thomas Phinney, Lake Forest Park, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1076 days.

(21) Appl. No.: 11/223,222

(22) Filed: Sep. 9, 2005

(51) Int. Cl.
*G06K 9/00* (2006.01)
*G06K 9/48* (2006.01)
*G06K 9/62* (2006.01)
*G06T 11/00* (2006.01)

(52) U.S. Cl. .................... 382/325; 382/187; 382/200; 382/209; 345/471

(58) Field of Classification Search ............... 382/112, 382/187, 209, 200, 325; 345/471
See application file for complete search history.

(56) References Cited

U.S. PATENT DOCUMENTS 6,496,600 B1 * 12/2002 Huang ..................... 382/187
6,741,745 B2 * 5/2004 Dance et al. .............. 382/229

* cited by examiner

*Primary Examiner*—Aaron W Carter
*Assistant Examiner*—Kathleen S Yuan
(74) *Attorney, Agent, or Firm*—Schwegman Lundberg & Woessner, P.A.

(57) ABSTRACT

A computer-implemented method of font identification includes receiving a first document, the first document including the first text set in a proportional font. Test text, corresponding to the first text of the first document, is received. The test text is set in a test font. A first fingerprint is generated, based on relative line widths of the first text of the first document. A second fingerprint is generated based on relative line widths of the test text, as set in the test font. The test font is then accepted as being consistent with a font of the first text, based on a predetermined strength of relationship between the first and second fingerprints.

29 Claims, 5 Drawing Sheets

Reproduction by Thomas Phinney, v. 3, 17 Sep 2004
Top: Times spacing
Bottom: IBM Composer spacing (using custom digital
font, with exact Composer widths, assuming 3 unit space.
Bigger space throws it off even more)

111th Fighter Interceptor Squadron
P. O. Box 34567
Houston, Texas 77034

01 August 1972

MEMORANDUM FOR RECORD

SUBJECT: Bush, George W. 1st Lt. 3244754FG
Suspension of Flight status

1. On this date I ordered that 1st Lt. Bush be suspended from flight status due to failure to perform to USAF/TexANG standards and failure to meet annual physical examination (flight) as ordered.

2. I conveyed my verbal orders to commander, 147th Ftr Intrcp Gp with request for orders for suspension and convening of a flight review board IAW AFM 35-13.

3. I recommended transfer of this officer to the 9921 st Air Reserve Squadron in May and forwarded his AF Form 1288 to 147 th Ftr Intrcp Gp headquarters. The transfer was not allowed. Officer has made no attempt to meet his training certification or flight physical. Officer expresses desire to transfer out of state including assignment to non-flying billets.

4. On recommendation of Harris, I also suggested that we fill this critical billet with a more seasoned pilot from the list of qualified Vietnam pilots that have rotated. Recommendations were received but not confirmed.

---

111th Fighter Interceptor Squadron
P. O. Box 34567
Houston, Texas 77034

01 August 1972

MEMORANDUM FOR RECORD

SUBJECT: Bush, George W. 1st Lt. 3244754FG
Suspension of Flight status

1. On this date I ordered that 1st Lt. Bush be suspended from flight status due to failure to perform to USAF/TexANG standards and failure to meet annual physical examination (flight) as ordered.

2. I conveyed my verbal orders to commander, 147th Ftr Intrcp Gp with request for orders for suspension and convening of a flight review board IAW AFM 35-13.

3. I recommended transfer of this officer to the 9921 st Air Reserve Squadron in May and forwarded his AF Form 1288 to 147 th Ftr Intrcp Gp headquarters. The transfer was not allowed. Officer has made no attempt to meet his training certification or flight physical. Officer expresses desire to transfer out of state including assignment to non-flying billets.

4. On recommendation of Harris, I also suggested that we fill this critical billet with a more seasoned pilot from the list of qualified Vietnam pilots that have rotated. Recommendations were received but not confirmed.

FIGURE 4

FONT IDENTIFICATION SYSTEM

FIELD

This application relates to a method and system to detect a font of a document and, in one example embodiment, to a method and system for generating a fingerprint based on text set in a proportional font.

BACKGROUND

Determining a font applied to glyphs in a document has to date generally has been performed by examining properties of individual glyphs of a candidate font, and then comparing these individual glyphs to glyphs that may be discerned in the document. However, with poor reproductions of a document, the original glyphs in the document may be too distorted to provide convenient or reliable identification.

The identification of a font in which glyphs within a particular document have been set may be important when attempting to assess whether a particular document is authentic, or is a forgery. Further, where font identification is required for a large number of documents, the processing of a large volume of documents presents a number of technical challenges. For example, the above described method of examining the properties of individual glyphs of a candidate font, and then comparing them to glyphs seen in the document, can be a particularly time consuming operation and may also require an analyst to spend a number of hours studying a particular document.

SUMMARY

According to one aspect of the present invention, there is provided a computer-implemented method of font identification. A first document is received, the first document including the first text set in a proportional font. A first fingerprint is generated, based on relative line widths of the first text of the first document. Test text, corresponding to the first text of the first document, is received. The test text is set in a test font. A second fingerprint is generated based on relative line widths of the test text, as set in the test font. The test font is then determined to be either consistent or inconsistent with the font of the first text, based on a predetermined strength of relationship between the first and second fingerprints.

Other features of the present invention will be apparent from the accompanying drawings and from the detailed description that follows.

BRIEF DESCRIPTION OF DRAWINGS

The present invention is illustrated by way of example and not limitation in the figures of the accompanying drawings, in which like references indicate similar elements and in which:

FIG. 4 illustrates first text of an original document, and test text corresponding to the first text, and illustrates variations in line widths that may be detected, according to example embodiments.

DETAILED DESCRIPTION

Figure 1:
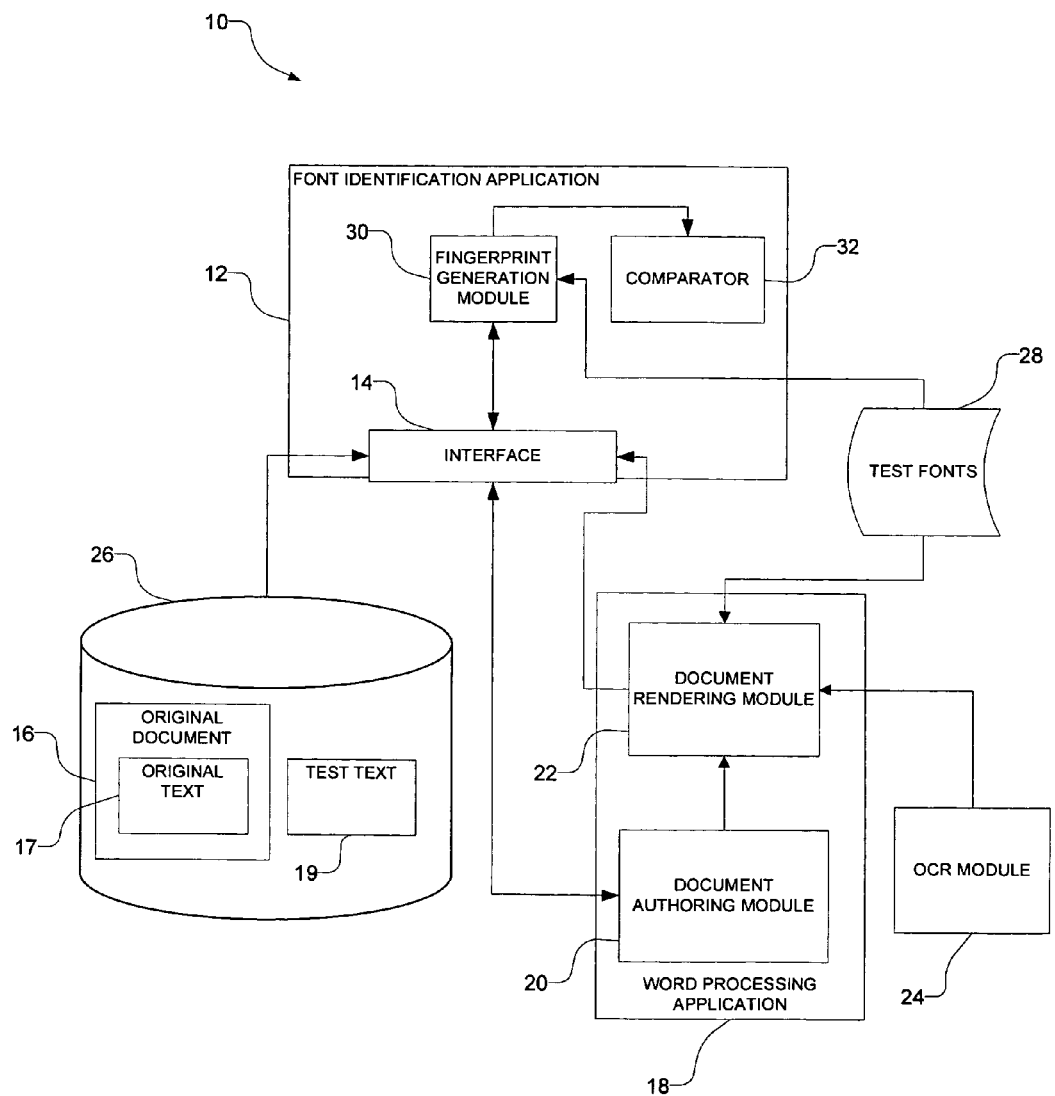
FIG. 1 is a diagrammatic representation of a system, according to an example embodiment, to perform automated font identification.

In the following description, for purposes of explanation, numerous specific details are set forth in order to provide a thorough understanding of an embodiment of the present invention. It will be evident, however, to one skilled in the art that the present invention may be practiced without these specific details.

For the purposes of the present application, the term "glyph" shall be taken to include a specific form of a character in a given font. For example, the letter "A" is an abstract character, while the letter "A" as it appears in this document is a glyph. Further, the term "advance width" is the amount of space occupied by a glyph, including any "white space" on either side of the glyph. For example, in some cases (e.g., "f"), it is possible for part of a glyph to extend beyond the advance width. Further, a "proportional font" is a font in which different characters have different pitches, or widths. Proportional fonts are also called proportional-pitch fonts. The opposite of a proportional font is a fixed-pitch font (or a monospaced font).

In an example embodiment, an automated analysis of glyph (or character) widths, with respect to a body of text arranged in lines (e.g., as appears in a printed document) can provide a distinctive "fingerprint." Even with a low-resolution text sample, given non-justified text and a proportional font, relative line endings (or relative line widths) can be examined to determine how well these correlate (or correspond) to the line endings (or line widths) created utilizing the same text as appears in the original document and using a candidate test font. This automated methodology is able to accommodate distortion in the original document as might, for example, be caused by multiple generations of photocopying, faxing and scanning.

In one embodiment, by examining a total a line length (or width), and by automatically comparing such total line length (or width) relative to preceding and following lines of text in a body of text, a measurement may be generated based on the total width of the line, which (less any white space on the side of the last glyph) is equal to the cumulative advance widths of the glyphs in each text line, relative to adjacent text lines. A full pattern of such differences (or alternatively relative proportions) across a sufficiently large sample of text lines provides a unique fingerprint of glyph widths for the body of text, set in a particular font.

In one embodiment, an automated comparison of the relative line width (or length) fingerprint of original text (i.e., set in an unknown font) against a further relative line length (or width) fingerprint for the same text set in a test font (test text) is performed. The original text may be non-justified text and may utilize a proportional font. If the relative line widths (or lengths) match across a sufficiently large sample (e.g., a page or several pages), then the candidate test font may be automatically accepted as consistent with the unknown font of the original text (e.g., the test text may correspond exactly to the unknown font, or the unknown font may be a font that is specifically designed to match the advance widths of glyphs set in the test font).

On the other hand, should the relative line widths (or lengths) of the test text not exhibit a predetermined strength of relationship with the relative line lengths of the original text, the candidate test font may be rejected and regarded as being inconsistent with the unknown font of the original text.

Accordingly, in one example embodiment, the invention provides for method and system for verifying that a test font is consistent or inconsistent with that used in an original document, using glyph width analysis. The verification is minimally dependent on the quality of reproduction of the original document. One embodiment may be utilized with non-justified text, which uses proportionally spaced fonts. The relative line lengths are analyzed for each pair of adjacent lines by identifying the shorter of the two adjacent lines, and determining how the last glyph in the shorter line matches up to an adjacent line (e.g., what glyph in the adjacent line the last glyph in the shorter line matches up to, and is shifted in what direction and by how much). For example, a glyph may be slightly ahead or behind relative to its most closely matched glyph on an adjacent line.

FIG. 1 is a block diagram illustrating a system 10, according to an example embodiment, to perform font identification with respect to original text in an original document (or in a reproduction of an original document). For example, the system 10 may be utilized to automatically identify a font of one or more original documents for the purposes of authenticating a reproduction of an original document.

The system 10 includes a font identification application 12, which in turn includes an interface 14 to receive original text 17 set in a proportional font in an original document 16, and also to receive test text 19 which may, in one embodiment, be received embodied within a test document (not shown). In one embodiment, the test text 19 may be received directly as text data from memory 26 of a computer system, and need not be included within a document.

Referring to the embodiment in which the test text 19 is received within a test document, the interface 14 is shown to be communicatively coupled to a word processing application 18, which includes a document-authoring module 20 and a document rendering module 22. An Optical Character Recognition (OCR) application 24 is shown to provide input to the document rendering module 22. Test text 19 corresponding to the original text 17 of the original document 16 may be manually inputted by a user utilizing the document authoring module 20, or may be automatically generated by the OCR application 24. In either case, the test text 19 is provided to the document rendering module 22, which proceeds to render the test text 19 into a test document, such that the text in each line of the test document corresponds to text in a corresponding respective line of the original document 16. The document rendering module 22 is then communicatively coupled via the interface 14 to the font identification application 12, and is accordingly able to communicate the test document via the interface 14 to the font identification application 12.

In another embodiment, the document authoring module 20 or the OCR application 24 may be utilized to generate test text 19 that is stored directly into memory 26, from where the test text 19 may be retrieved by the font identification application 12 via the interface 14.

The font identification application 12 also includes a fingerprint generation module 30 that, in one example embodiment, operates to generate a first fingerprint based on the relative line widths (or lengths) of the original text 17, the relative line widths of the original text 17 being determined according to text lines that appear in the original document 16.

The fingerprint generation module 30 also operates to generate a second fingerprint based on relative line widths of the test text 19, wherein each line of the test text 19 includes text corresponding to a respective line of the original text 17 as included in the original document 16. Further details regarding the manner in which the fingerprint generation module 30 operates to generate fingerprints, according to an example embodiment, are discussed below with reference to FIG. 3.

It will be noted that, in respective embodiments, the fingerprint generation module 30 and the document rendering module 22 are shown to be coupled to a collection of test fonts 28 that may be applied to the test text 19 prior to the generation of the second fingerprint based on the relative line widths of the test text 19. In one embodiment, the test fonts 28 are applied to the test text 19, as contained in a test document generated by the document rendering module 22 prior to the test document being communicated to the font identification application 12 via the interface 14.

In another embodiment, the test fonts are applied to the test text 19 by the fingerprint generation module 30 itself, prior to the generation of the second fingerprint. As will be described in further detail below, the fingerprint generation module 30 and/or the document rendering module 22 may sequentially apply candidate text fonts from the test fonts 28 to the test text 19 until a previously unknown font of the original text 17 is identified by the font identification application 12.

The font identification application 12 is also shown to include a comparator 32, communicatively coupled to the fingerprint generation module 30, to receive the first and second fingerprints, and to perform a comparison between the first and second fingerprints to determine whether a predetermined strength of relationship exists between the first and second fingerprints. Further, the comparator 32 may accept a test font 28, in which the test text 19 has been set, as being consistent with a previously unknown font of the original text 17 if a predetermined strength of relationship is detected between the first and second fingerprints. In one embodiment, the predetermined strength of relationship may be received by the font identification application 12 as a user input. In a further embodiment, the predetermined strength of relationship between the first and second fingerprints may be programmed as part of the comparator 32.

The comparator 32 may furthermore reject a candidate test font 28 on the basis that it is inconsistent with an unknown font of the original text 17, based on the lack of a predetermined strength of relationship between the first and second fingerprints.

Figure 2:
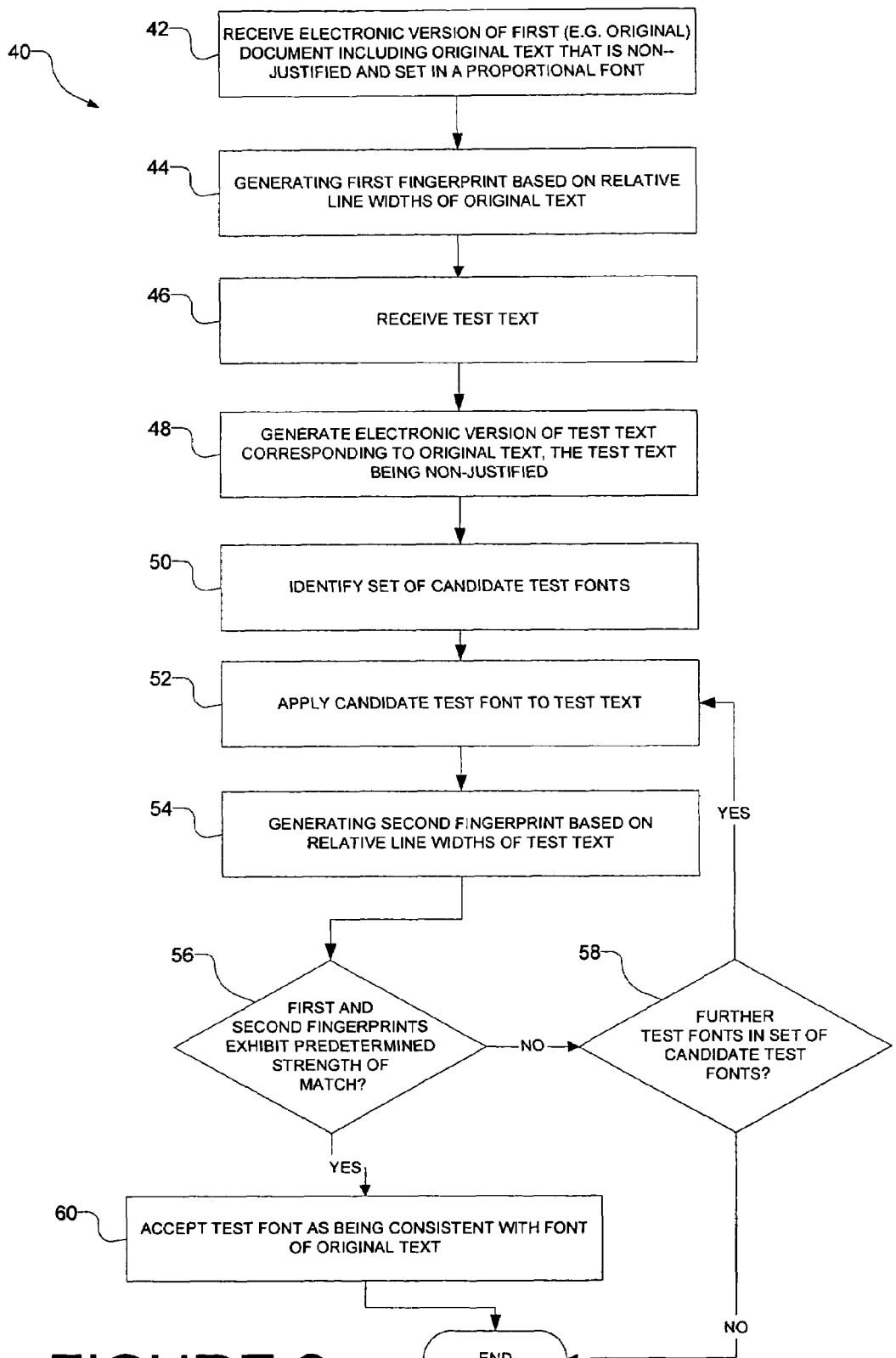
FIG. 2 is a flow chart illustrating a method, according to an example embodiment, to perform automated font identification.

FIG. 2 is a flow chart illustrating a method 40, according to an example embodiment, to perform font identification with respect to an original document. In one embodiment, the method 40 performs such font identification utilizing the relative line endings (or relative line widths) of original text 17 included within the original document 16, and test text 19 which is set in one or more test fonts.

The method 40 commences at block 42 with the receipt of an electronic version of an original document 16 that includes original text 17. The original text 17 is non-justified and set in a proportional font. Specifically, the original document 16 may be received by the font identification application 12, as hosted on a computer system, via the interface 14, and communicated to the fingerprint generation module 30 for further processing.

At block 44, the fingerprint generation module 30 generates a first fingerprint based on the relative line widths of the original text 17, as set within the original document 16 in an unknown font. Further details regarding in an example manner in which the fingerprint may be generated are described below with reference to FIG. 3.

At block 46, the font identification application 12 receives the test text 19, via the interface 14, for processing by the fingerprint generation module 30. In one embodiment, the test text 19 may be manually inputted by a user, utilizing the document authoring module 20. In a further embodiment, the test text 19 may be automatically generated from the original text 17 utilizing the OCR application 24. As also described above, the test text 19 may be received by the fingerprint generation module 30 either as text data, or within the context of a test document generated by the document rendering module 22.

Having received the test text 19 at block 46, at block 48 the fingerprint generation module 30 generates an internal electronic version of the test text 19 corresponding to the original text 17. The test text 19 generated at block 48 is furthermore grouped into lines of test text corresponding to respective lines of original text 17 in the original document 16. Further, the test text 19 is formatted at block 48 to be non-justified and set in a proportional font.

Moving on to block 50, the fingerprint generation module 30 identifies the set of test fonts 28 and, at block 52, applies a candidate test font, from the set of test fonts 28, to the test text 19.

At block 54, the fingerprint generation module 30 generates a second fingerprint, based on the relative line widths (or lengths) of the test text 19 as set in the candidate test font at block 52.

Referring to blocks 48-52, in the above described embodiment, the processing of the test text 19 is described as being performed in memory by the fingerprint generation module 30. However, in an alternative embodiment, in which the test text 19 is rendered as a second document, the grouping of the test text into lines corresponding to lines of the original text 17, the identification of the set of test fonts 28, and the application of a test font may be performed by the document rendering module 22, in which case processed test text 19 is communicated, via the interface 14, to the fingerprint generation module 30 which then simply generates the second fingerprint based on the test document at block 54.

At decision block 56, the comparator 32 determines whether the first and second fingerprints display a predetermined strength of relationship. In one embodiment, the predetermined strength of relationship may be user inputted to the font identification application 12. In another embodiment, the predetermined strength of relationship may be programmed into the comparator 32.

Figure 3:
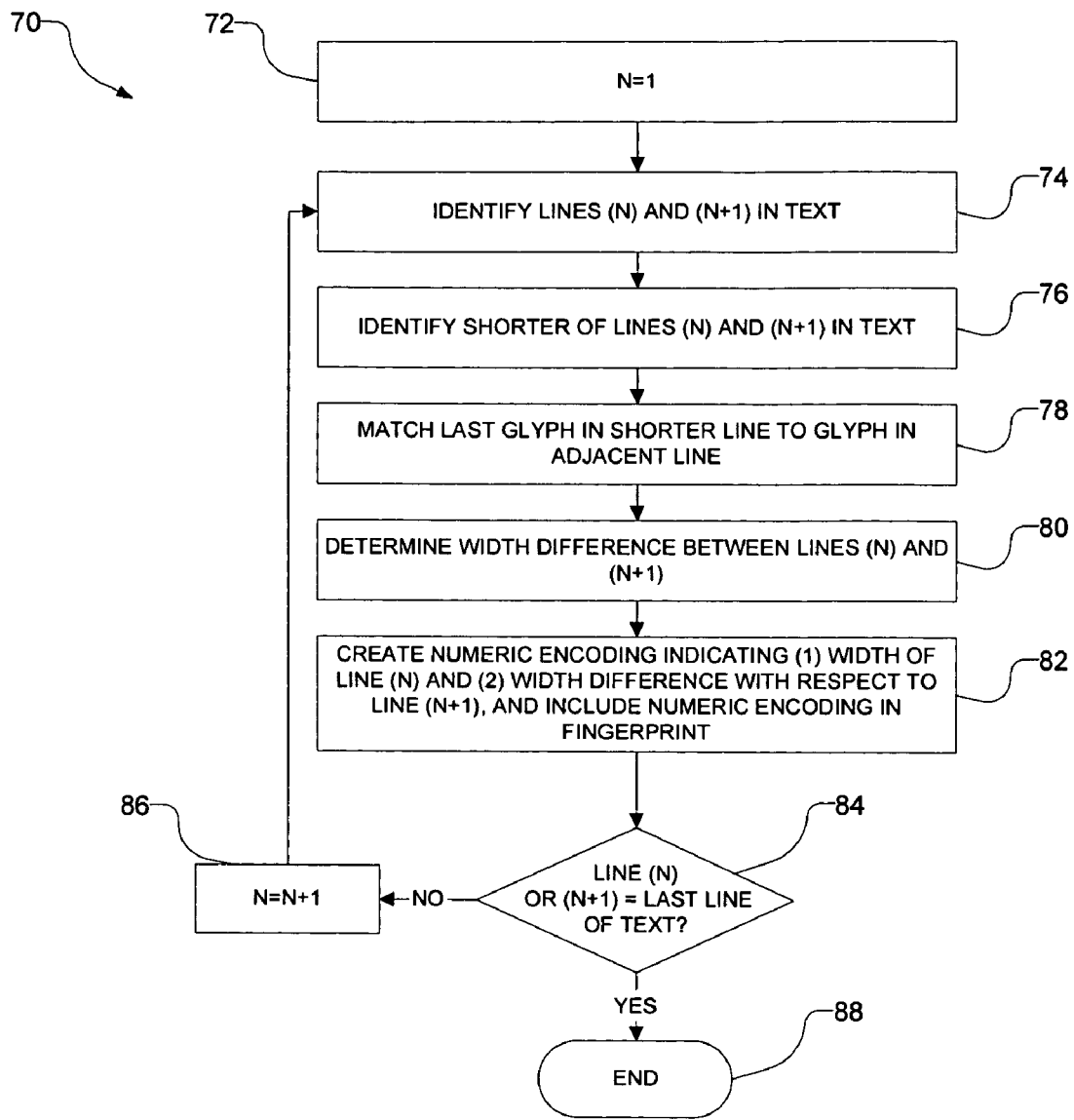
FIG. 3 is a flow chart illustrating a method, according to an example embodiment, to generate a fingerprint based on relative line widths of a body of text set in a proportional font.

In one embodiment, and as described further with reference to FIG. 3, each of the fingerprints may include numeric encodings representative of the relative line widths of each of the original text 17 and the test text 19, wherein each of lines of the texts 17 and 19 include the same text. In this case, the predetermined strength of relationship may be determined by performing a comparison between the numeric encodings included in each of the first and second fingerprints.

In the event that the first and second fingerprints do not exhibit the predetermined strength of relationship, the method 40 progresses to decision block 58 where the comparator 32 rejects the candidate test font as being inconsistent with the unknown font of the original text 17. A determination is also made as to whether there are any further test fonts in the set of test fonts 28 that may be applied as candidate test fonts to the test text 19. If so, the method 40 loops back to block 52. If not, the method 40 then terminates at termination block 62.

Returning to decision block 56, if on other hand the first and second fingerprints are determined by the comparator 32 to exhibit the requisite predetermined degree of a correlation, the method 40 progresses to block 60 where the comparator 32 accepts the candidate test font, in which the test text 19 is set, as being consistent with the unknown font of the original text 17. In this way, the unknown font of the original text 17 may be identified as being the same as the successful candidate test font, or as being a font that is specifically designed to match the candidate test font in width (e.g. the font ARIAL was designed to match the advance widths of HELVETICA). The method 40 then again terminates at termination block 62.

FIG. 3 is a flow chart illustrating a method 70, according to an example embodiment, to generate a fingerprint for text, set in a proportional font, based on relative line widths of text lines that constitute the relevant text. The method 70 may, in one embodiment, be applied to generate (at block 44) both the first fingerprint based on the relative line widths of the original text 17 and to generate (block 54. the second fingerprint based on the relative line widths of the test text 19.

The method 70 proposes analyzing relative line lengths for each pair of adjacent lines in a respective text.

The method 70 commences at block 72 by setting a line identifier variable N to a value of "1" and, at block 74, identifying lines N and N+1 in the relevant text.

At block 76, the shorter of the lines N and N+1 is identified, and at block 78 the last glyph in the shorter line is matched to a glyph in the adjacent line. Specifically, a match up may be performed between the last glyph of the shortest line and a glyph in the adjacent line, and a determination may also be made as to whether the glyph in the adjacent line is slightly ahead or slightly behind relative to the last glyph of the shorter line.

At block 80, the width difference between the lines N and N+1 is determined, and expressed as a numeric encoding. In one embodiment, the width difference may be expressed as a number of glyphs (e.g., the width difference between the line N and line N+1 is 12.3 glyphs). In this embodiment, the difference is expressed as an approximation of partial glyphs, to one decimal point. In further embodiments, the width difference may be expressed as any absolute value, or as a proportion of the relative widths of the adjacent lines. For example, the width of line N may be expressed as a proportion of line N+1, or alternatively, the width of the longer line may be expressed as a proportion of the width of the shorter line (or vice versa).

Moving into block 82, a numeric encoding is created to indicate (1) the length of at least one of the lines in the adjacent glyph (e.g., line N or line N+1) and (2) a width difference between the respective lines. For example, a numeric encoding of (72; 6.5) may indicate that the first line N is 76 glyphs in length, and is 6.5 glyphs longer than the second line. In a further example, a numeric encoding of (66; −12.3) may indicate that a second line is 66 glyphs in length, and is 12.3 glyphs shorter than a third line.

At decision block 84, a determination is made as to whether line N or line N+1 is the last line of the relevant text. If not, then the line variable N is incremented by 1 (or in the alternative embodiment by 2), and the method 70 loops back to block 74 where the method 70 then again cycles through the operations at block 74-82 to generate numeric encoding based on the next two lines in the respective text.

On the other hand, should it be determined at decision block 84 that line N (or line N+1) is the last line of the text, the method 70 then terminates at block 88.

FIG. 4 illustrates exemplary original text 17 and corresponding test text 19. In the example embodiment, the original text 17 is set in an unknown proportion, whereas the test text 19 is set in a known, proportional test font. FIG. 4 illustrates how a numeric encoding may be generated for inclusion in a fingerprint for each of the original text 17 and test text 19 based on relative line widths.

Looking firstly at the original text 17, FIG. 4 identifies an adjacent pair 90 of lines 92 and 94. Referencing the method 70 described above with reference to FIG. 3, at block 76, a shorter of the pair 90 of lines (i.e., line 94) is identified at block 76, and the last glyph of line 94 is then matched to a glyph in the adjacent longer line 92, as indicated at 96. A width difference 98 between the lines 92 and 94 may then be automatically determined by the fingerprint generation module 30.

Turning to the test text 19, it will be noted that a corresponding pair 100 of text lines 102 and 104 are identified, with line 104 being the shorter text line. A match up of the last glyph of line 104 with a glyph of the line 102, as illustrated at 106, indicates that the last glyph of line 104 matches up with a different glyph than the match up indicated at 96 with respect to the original text 17.

Further, it will be appreciated that a determined width difference 108 between the lines 102 and 104 will be different from width difference 98 between the lines 92 and 94. The inclusion of the width differences 98 and 108 in respective fingerprints for the original text 17 and test text 19 will serve to differentiate the relevant fingerprints. Assuming that the fingerprints differ sufficiently, the comparator 32 will determine that the candidate test font in which the test text 19 is set is different from the unknown font in which the original text 17 is set.

In summary, in one example embodiment, the present invention proposes to identify where each line of original text 17 and test text 19 ends relative to the lines above and below. This may be done, for example, with reference to glyphs ending the respective lines, and which glyphs align on adjacent lines. The results of this analysis may generate a very compact but a precise manner of recording the analysis either graphically, or as a numerical encoding. The above described method may be resistant to distortions in the reproduction of original text from one or many generations of reproduction using any one of a variety of technologies (e.g. fax, photocopying, scan, or photograph).

Figure 5:
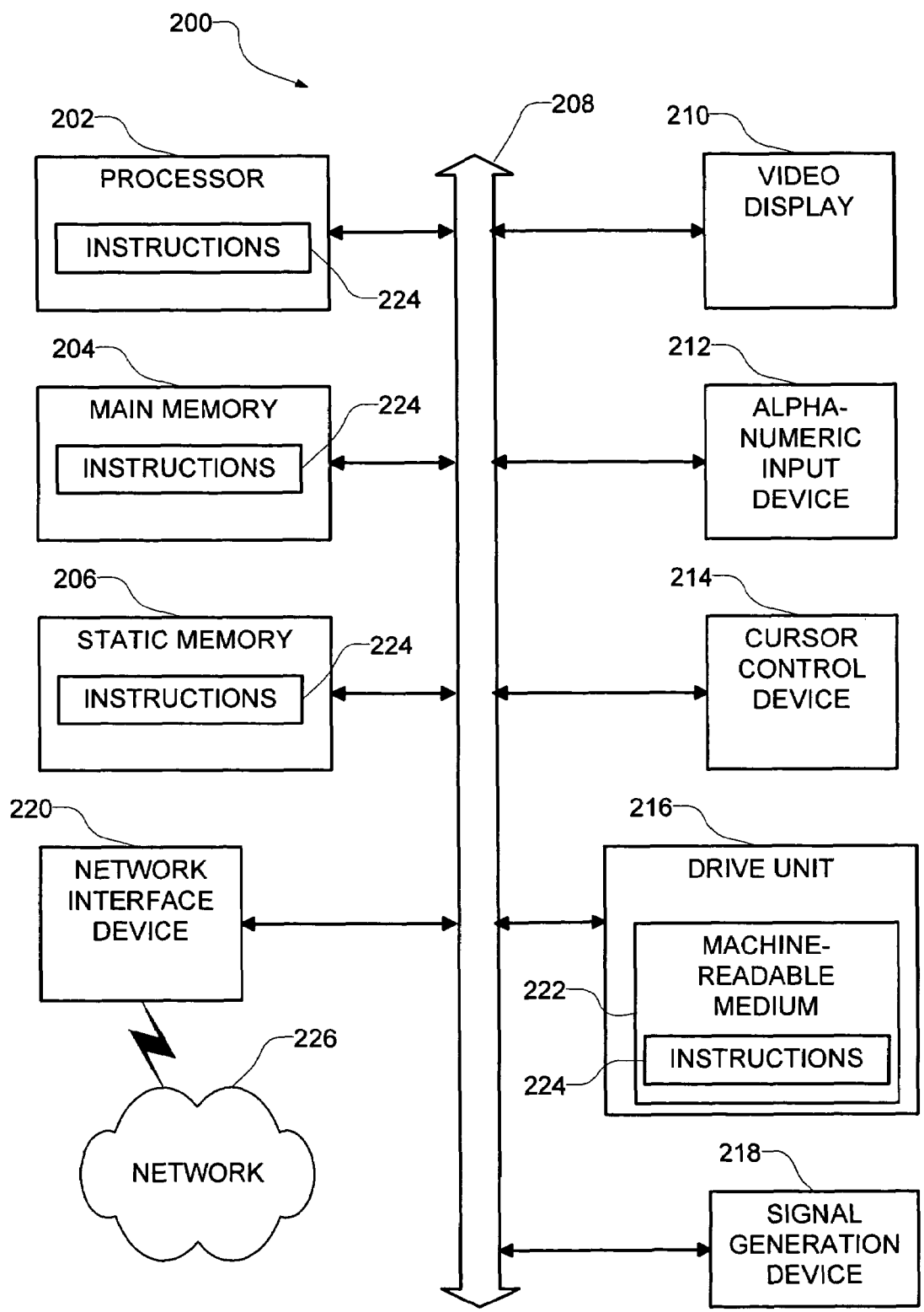
FIG. 5 is a diagrammatic representation of a machine, in the example form of a computer system, within which a set of instructions for causing the machine to perform any one or more of the methodologies discussed herein may be executed.

FIG. 5 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method of font identification, the computer-implemented method including:
   receiving a first document via an interface, the first document including first text set in a proportional font;
   using a document rendering module, generating test text corresponding to the first text of the first document, the test text being set in a test font;
   using a fingerprint generation module, generating a first fingerprint based on first relative line widths of the first text in the first document, the first relative line widths based on width differences from line endings of lines in the first document;
   using the fingerprint generation module, generating a second fingerprint based on second relative line widths of the test text, the second relative line widths based on the width differences from the line endings of the lines in the test document; and
   using a comparator, determining a strength of match between a test font and a font of the first text by comparing the first and second fingerprints.

2. The computer-implemented method of claim 1, including rejecting the test font as being inconsistent with the font of the first text if the strength of match is less than a predetermined strength of match between the first and second fingerprints.

3. The computer-implemented method of claim 1, wherein the generating of the test text includes grouping the test text into lines of test text corresponding to the respective lines of the first text in the first document, and wherein the generating of the second fingerprint includes determining the second relative line widths of the lines of test text.

4. The computer-implemented method of claim 1, wherein the generating of the test text includes generating a second document to include the test text, each text line of the second document corresponding to text in a respective line of the first document and wherein the generating of the second fingerprint includes determining the second relative line widths of the test text lines of the second document.

5. The computer-implemented method of claim 1, wherein the generating of each of the first and second fingerprints includes expressing the respective relative line widths as numeric encodings.

6. The computer-implemented method of claim 5, wherein the generating of each of the first and second fingerprints includes including a width of the first line as part of the respective fingerprint.

7. The computer-implemented method of claim 6, wherein the width of the first line is expressed as a number of glyphs.

8. The computer-implemented method of claim 6, wherein the width of the first line is expressed as an absolute value.

9. The computer-implemented method of claim 1, wherein the generating of each of the first and second fingerprints includes:
  measuring a width difference between first and second lines of respective text; and
  including the width difference as part of a respective fingerprint.

10. The computer-implemented method of claim 9 wherein the width difference is expressed as an absolute value.

11. The computer-implemented method of claim 9, wherein the width difference is expressed as a number of glyphs.

12. The computer-implemented method of claim 1, wherein the generating of each of the first and second fingerprints includes:
  determining a proportional value of line widths of first and second lines of respective text; and
  including the proportional value as part of a respective fingerprint.

13. The computer-implemented method of claim 1, wherein the first text of the first document is non-justified text.

14. The computer-implemented method of claim 1, wherein the generating of the test text includes at least one of performing optical character recognition (OCR) with respect to the first text of the first document and manually inputting the test text.

15. The computer-implemented method of claim 1, including receiving a predetermined strength of relationship from a user as input.

16. The method of claim 1, further comprising accepting the test font as being consistent with a font of the first text if the strength of match exceeds a predetermined strength of match between the first and second fingerprints.

17. A tangible, machine-readable medium embodying a set of instructions that, when executed by a machine, cause the machine to perform the computer-implemented method of claim 1.

18. A computer system of font identification, the computer system including:
  a memory storage device to store a test font; and
  a processor to implement:
    an interface to receive a first document, the first document including first text set in a proportional font, and to receive test text corresponding to the first text of the first document, the test text being set in the test font;
    a fingerprint generation module to generate a first fingerprint based on first relative line widths of first text, the first relative line widths based on width differences from line endings of lines in the first document, and to generate a second fingerprint based on second relative line widths of the test text, the second relative line widths based on the width differences from the line endings of the lines in the test document; and
    a comparator to determine a strength of match between a test font and a font of the first text by comparing the first and second fingerprints.

19. The computer system of claim 18, wherein the comparator is to reject the test font as being inconsistent with the font of the first text if the strength of match is less than a predetermined strength of relationship between the first and second fingerprints.

20. The computer system of claim 18, wherein the fingerprint generation module is to group the test text into lines of test text corresponding to the respective lines of the first text in the first document, and is to determine the second relative line widths of the lines of test text.

21. The computer system of claim 18, including a document rendering module to generate a second document to include the test text, each text line of the second document corresponding to text in a respective line of the first document and wherein the fingerprint generation module is to determine the second relative line widths of the test text lines of the second document.

22. The computer system of claim 18, wherein the fingerprint generation module is to generate each of the first and second fingerprints by expressing the respective relative line widths as numeric encodings.

23. The computer system of claim 18, wherein the fingerprint generation module is to:
  measure a width difference between first and second lines of respective text; and
  include the width difference as part of a respective fingerprint.

24. The computer system of claim 23, wherein the fingerprint generation module is to include a width of the first line as part of the respective fingerprint.

25. The computer system of claim 18, wherein the fingerprint generation module is to:
  determine a proportional value of line widths of first and second lines of respective text; and
  include the proportional value as part of a respective fingerprint.

26. The computer system of claim 18, wherein the first text of the first document is non-justified text.

27. The computer system of claim 18, wherein the interface is to receive a predetermined strength of relationship from a user as input.

28. The computer system of claim 18, wherein the comparator is to accept the test font as being consistent with a font of the first text if the strength of match exceeds a predetermined strength of match between the first and second fingerprints.

29. A computer system of font identification, the computer system including:
  first means for receiving a first document, the first document including first text set in a proportional font, and for receiving test text corresponding to the first text of the first document, the test text being set in a test font;

second means for generating a first fingerprint based on first relative line widths of the first text, the first relative line widths based on width differences from line endings of lines in the first document, and for generating a second fingerprint based on second relative line widths of the test text, the second relative line widths based on the width differences from the line endings of the lines in the test document; and third means for accepting the test font as being consistent with a font of the first text based on a predetermined strength of relationship between the first and second fingerprints.

* * * * *

UNITED STATES PATENT AND TRADEMARK OFFICE
CERTIFICATE OF CORRECTION

PATENT NO. : 7,720,318 B1  Page 1 of 1
APPLICATION NO. : 11/223222
DATED : May 18, 2010
INVENTOR(S) : Thomas Phinney It is certified that error appears in the above-identified patent and that said Letters Patent is hereby corrected as shown below:

In column 9, line 20, in Claim 6, delete "includes including" and insert -- including --, therefor.

Signed and Sealed this

Thirteenth Day of July, 2010

David J. Kappos
*Director of the United States Patent and Trademark Office*